May 5, 1931.  R. BERGERIOUX  1,803,521
DISTRIBUTING DEVICE FOR DISTRIBUTOR DRILLS
Filed Dec. 18, 1929
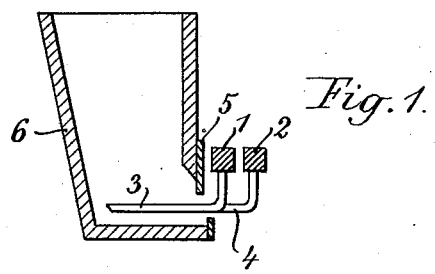
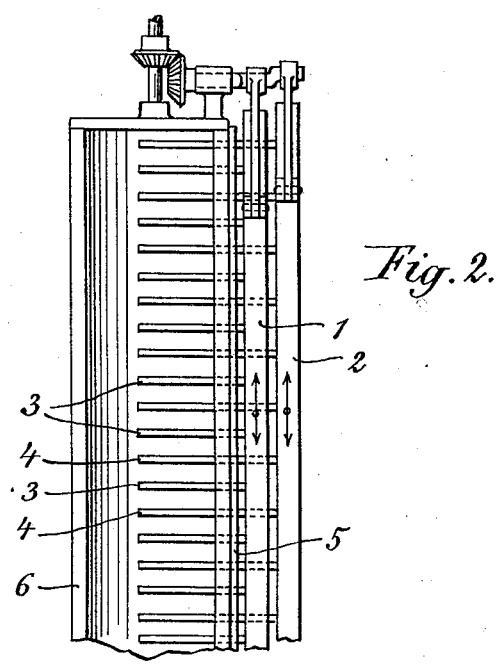
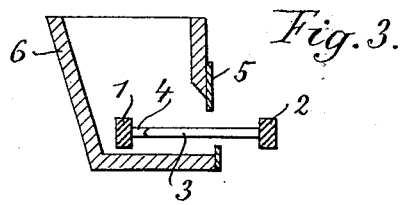
Inventor:
Bergerioux René.

Patented May 5, 1931

1,803,521

UNITED STATES PATENT OFFICE

RENÉ BERGERIOUX, OF REUILLY, FRANCE

DISTRIBUTING DEVICE FOR DISTRIBUTOR DRILLS

Application filed December 18, 1929, Serial No. 415,108, and in France December 21, 1928.

This invention concerns a distributing device for reciprocating distributor drills, said device offering the advantage that each comb or porcupine is caused to operate in a perfectly identical manner on the distributing slot appertaining thereto and to cause more complete an obturation of the said slot by the controlling sluice valve when the teeth or prongs of the comb are passing through the said distributing slot.

In the drawing appended hereto,

Fig. 1 is a section, and

Fig. 2 a plane view of one embodiment;

Fig. 3 is a section of a second embodiment of a device constructed in accordance with my invention.

My distributing device is composed of two reciprocating rods 1 and 2 which are provided with teeth or prongs 3 and 4 forming thus two combs or porcupines. The operative part of those two series of teeth or prongs is in the same plane so that the teeth of the one comb will engage in between the teeth of the other one.

The distributing slot through which the teeth pass may be advantageously provided with a controlling sluice valve 5 arranged on one of the walls of the box 6 that contains the material to be sown. Reciprocation of both combs has the effect that the teeth of one of the combs move in the free spaces between the teeth of the other comb.

In the first embodiment illustrated, rods 1 and 2 are arranged outside the box and in one and the same plane. Obviously they might be arranged in any other convenient manner, as, for instance, above one another, or the one outside and the other one inside the box, as indicated on Fig. 2 or both of them inside the box, in which case the free ends of the teeth might either stop in front of the distributing slot or pass therethrough.

Furthermore, my device may be used on drills provided with two distributor slots without departing from the scope of my invention.

I claim:

A distributing device for reciprocating distributor drills, comprising two parallel distributing combs having intermeshing teeth arranged in the same plane, and a separate operating crank for each comb, the two cranks being angularly displaced relative to each other.

RENÉ BERGERIOUX.